United States Patent
Shih et al.

(10) Patent No.: US 11,686,900 B2
(45) Date of Patent: Jun. 27, 2023

(54) SEMICONDUCTOR PACKAGE, OPTICAL DEVICE AND METHOD OF FABRICATING THE SAME

(71) Applicant: Taiwan Semiconductor Manufacturing Company, Ltd., Hsinchu (TW)

(72) Inventors: Chih-Tsung Shih, Hsinchu (TW); Felix Yingkit Tsui, Cupertino, CA (US); Stefan Rusu, Sunnyvale, CA (US); Chewn-Pu Jou, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/199,365

(22) Filed: Mar. 11, 2021

(65) Prior Publication Data

US 2022/0291449 A1 Sep. 15, 2022

(51) Int. Cl.
| | |
|---|---|
| *G02B 6/12* | (2006.01) |
| *G02B 6/13* | (2006.01) |
| *H04B 10/50* | (2013.01) |
| *G02B 6/26* | (2006.01) |
| *F21V 8/00* | (2006.01) |

(52) U.S. Cl.
CPC ....... *G02B 6/12014* (2013.01); *G02B 6/0065* (2013.01); *G02B 6/13* (2013.01); *G02B 6/26* (2013.01); *H04B 10/503* (2013.01)

(58) Field of Classification Search
CPC .... G02B 6/12014; G02B 6/0065; G02B 6/13; G02B 6/26; H04B 10/503
USPC .......................................................... 385/24
See application file for complete search history.

(56) References Cited

U.S. PATENT DOCUMENTS

| | | | | |
|---|---|---|---|---|
| 6,104,847 | A * | 8/2000 | Seino ................. | G02B 6/12011 398/1 |
| 6,403,393 | B1 * | 6/2002 | Adkisson ............... | G02B 6/122 438/31 |
| 2005/0220397 | A1 * | 10/2005 | Oikawa ............... | H04J 14/0224 385/24 |

FOREIGN PATENT DOCUMENTS

WO    WO-2013105466 A1 *  7/2013   ......... G02B 6/12014

* cited by examiner

*Primary Examiner* — Jerry M Blevins
(74) *Attorney, Agent, or Firm* — JCIPRNET

(57) ABSTRACT

An optical device includes an input array, an output array and a waveguide array. The input array is connected to a first slab structure, while the output array is connected to a second slab structure. The waveguide array is optically coupled to the first slab structure and the second slab structure. The waveguide array includes a first connecting part, a second connecting part and a plurality of waveguide channels. The first connecting part is joined with the first slab structure. The second connecting part is joined with the second slab structure, wherein the second connecting part includes a central portion and at least one flank portion, the central portion is connected to and overlapped with the second slab structure, and the at least one flank portion extends over a side surface of the second slab structure. The waveguide channels are joining the first connecting part to the second connecting part.

20 Claims, 15 Drawing Sheets

… (1)

SEMICONDUCTOR PACKAGE, OPTICAL DEVICE AND METHOD OF FABRICATING THE SAME

BACKGROUND

Optical signals are usable for various applications including high speed and secure data transmission between two devices. In some applications, a device capable of optical data transmission includes at least an integrated circuit (IC or "chip") having a laser die for transmitting and/or receiving optical signals. Also, the device usually has one or more other photonic/optical or electrical components, a waveguide for the transmission of the optical signals, and a support, such as a substrate of a printed circuit board, on which the chip equipped with the laser die and the one or more other components are mounted. The performance of photonic or optical components may be affected due to the dimension tolerance from fabrication or due to the changes in material properties from environment or processing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the critical dimensions of the various features may be arbitrarily increased or reduced for clarity of discussion.

DETAILED DESCRIPTION

Figure 1:
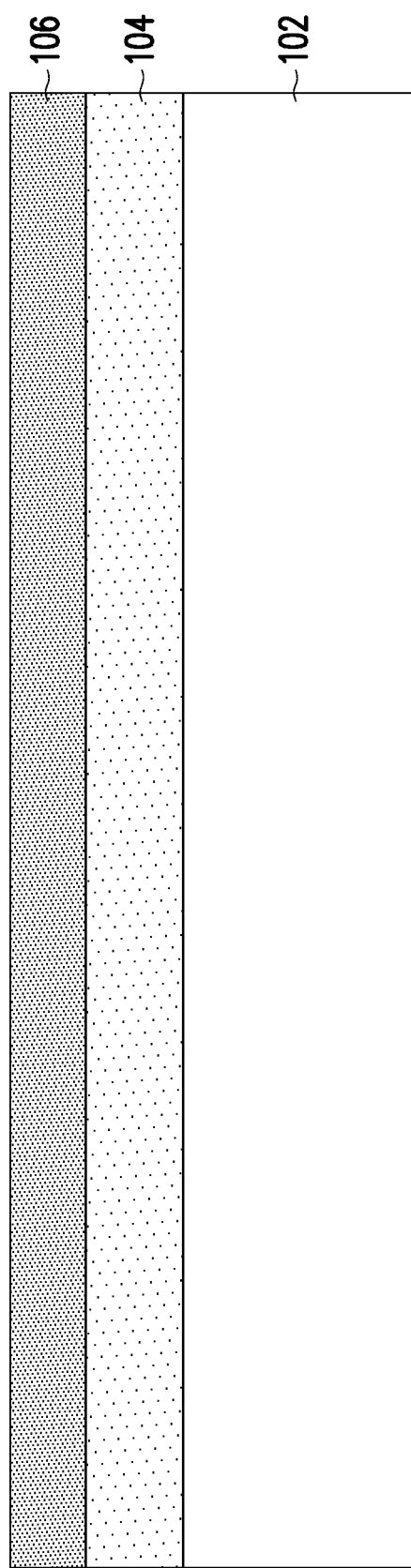
FIG. 1 to FIG. 10 are schematic sectional and top views of various stages in a method of fabricating a semiconductor package according to some exemplary embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a second feature over or on a first feature in the description that follows may include embodiments in which the second and first features are formed in direct contact, and may also include embodiments in which additional features may be formed between the second and first features, such that the second and first features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath", "below", "lower", "on", "over", "overlying", "above", "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments discussed herein may be discussed in a specific context, namely a method of fabricating a semiconductor package or a method of fabricating an optical device including a waveguide structure (e.g. an arrayed waveguide grating (AWG)). Waveguide structures based on AWG may have non-uniform transmission spectrum of signals from the output waveguides due to channel insertion loss and channel cross talk. In some embodiments of the present disclosure, the semiconductor package or optical device includes a waveguide structure that can reduce insertion loss, and improve the channel uniformity of the transmission spectrum.

FIG. 1 to FIG. 10 are schematic sectional and top views of various stages in a method of fabricating a semiconductor package according to some exemplary embodiments of the present disclosure. Referring to FIG. 1, a substrate 102 is provided. The substrate 102 may be a semiconductor substrate, which may be a silicon substrate, a silicon germanium substrate, or a substrate formed of other semiconductor materials. In accordance with some alternative embodiments, the substrate 102 is a dielectric substrate formed of silicon oxide, for example.

In some embodiments, a dielectric layer 104 and a core material 106 are sequentially formed over the substrate 102. In other words, the dielectric layer 104 is sandwiched between the substrate 102 and the core material 106. The dielectric layer 104 may be formed of silicon oxide, silicon nitride, or the like. The core material 106 may be formed over the dielectric layer 104 to contact the dielectric layer 104. In some embodiments, the core material 106 is formed of silicon, silicon nitride, silicon oxynitride (SiON), indium phosphide (InP), or the like. In certain embodiments, the core material 106 is any suitable material used to form the waveguide structures for the internal transmission of optical signals.

Figure 2:
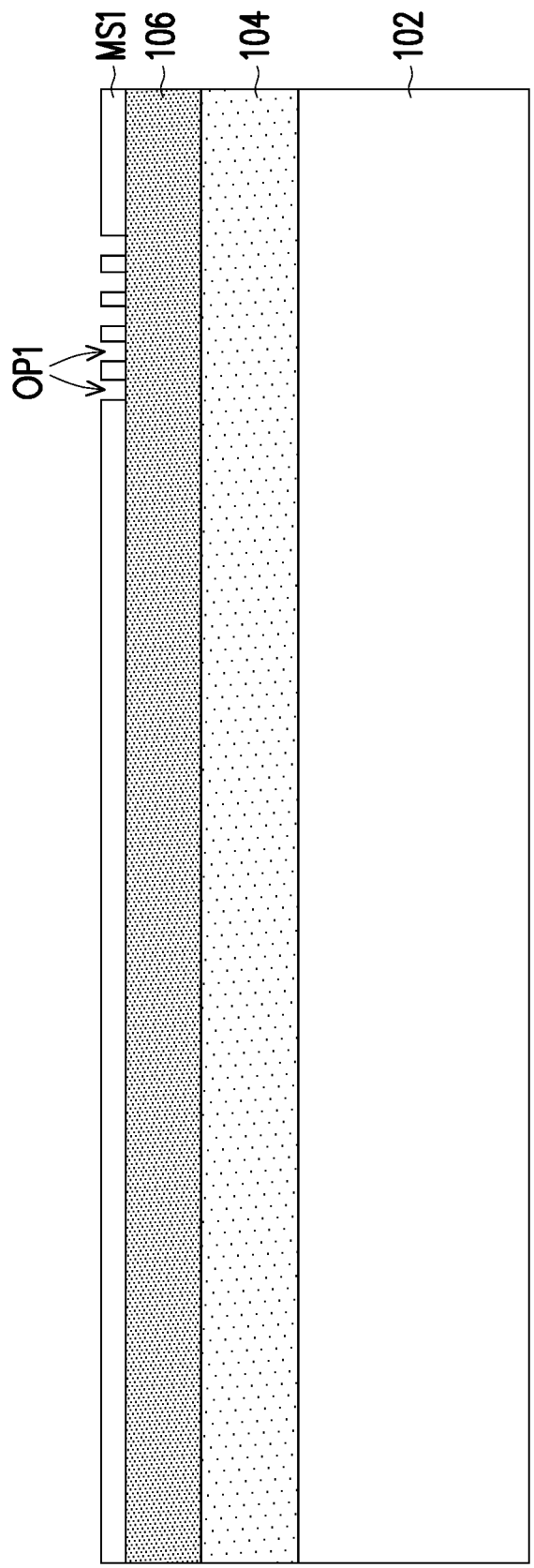
Figure 3:
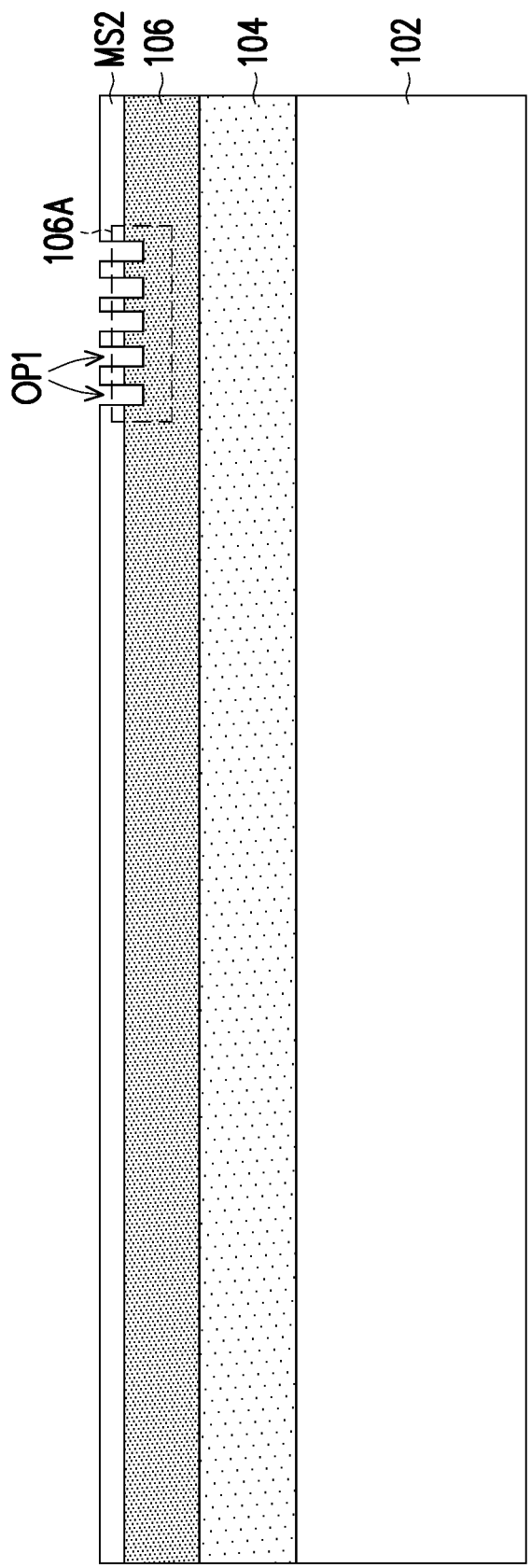

Referring to FIG. 2, in a subsequent step, a mask layer MS1 (hard mask) is provided over the core material 106 to cover portions of the core material 106. The mask layer MS1 includes a plurality of openings OP1 exposing top surfaces of the core material 106. In some embodiments, the mask layer MS1 includes a positive photo-resist or a negative photo-resist. Referring to FIG. 3, after providing the mask layer MS1 over the core material 106, the core material 106 may be patterned to form a grating coupler 106A. For example, portions of the core material 106 not covered by the mask layer MS1 are removed to form the grating coupler 106A. In some embodiments, the core material 106 is patterned through a photolithography process. In some embodiments, the grating coupler 106A have gratings, and have the function of receiving light or transmitting light. As such, the grating coupler 106A may be used for receiving light from an overlying light source or optical signal source and transmit the light to a waveguide structure formed thereafter.

Figure 4:
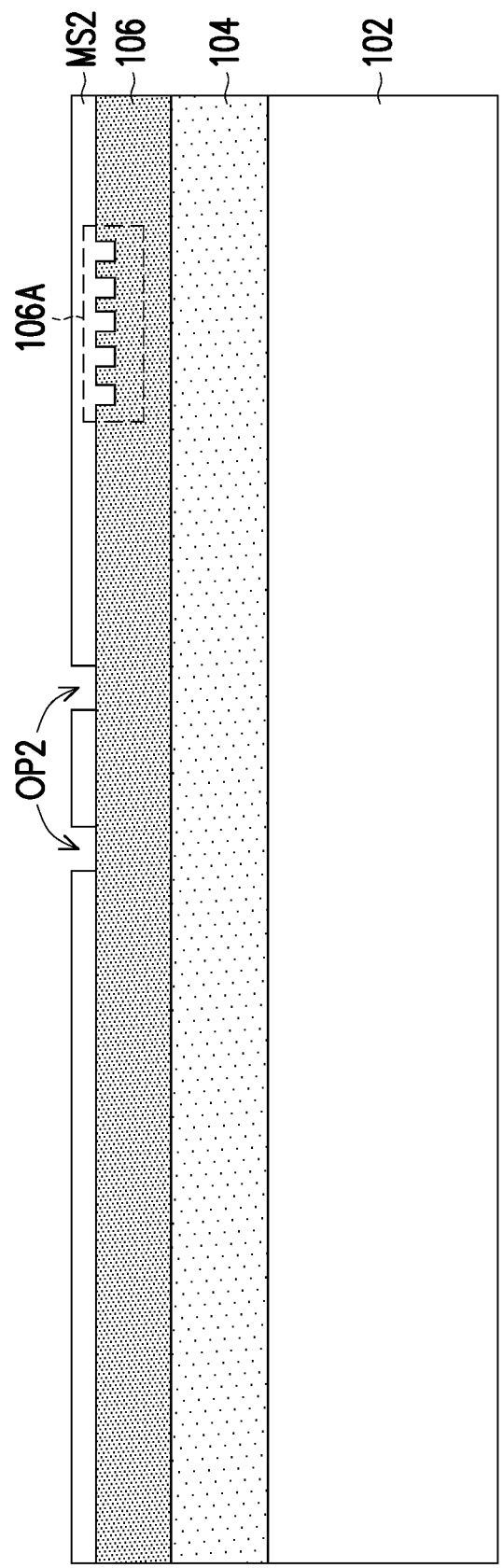

Referring to FIG. 4, after forming the grating coupler 106A, the mask layer MS1 is removed or peeled off from the top surface of the core material 106. Thereafter, a second mask layer MS2 (hard mask) is provided over the core material 106. For example, the second mask layer MS2 covers a top surface of the core material 106 and covers the grating coupler 106A. In some embodiments, the second mask layer MS2 includes a plurality of openings OP2 exposing top surfaces of the core material 106. The patterns of the openings OP2 correspond to the patterns of a waveguide structure formed thereafter. In some embodiments, the second mask layer MS2 includes a positive photo-resist or a negative photo-resist.

Figure 5A:
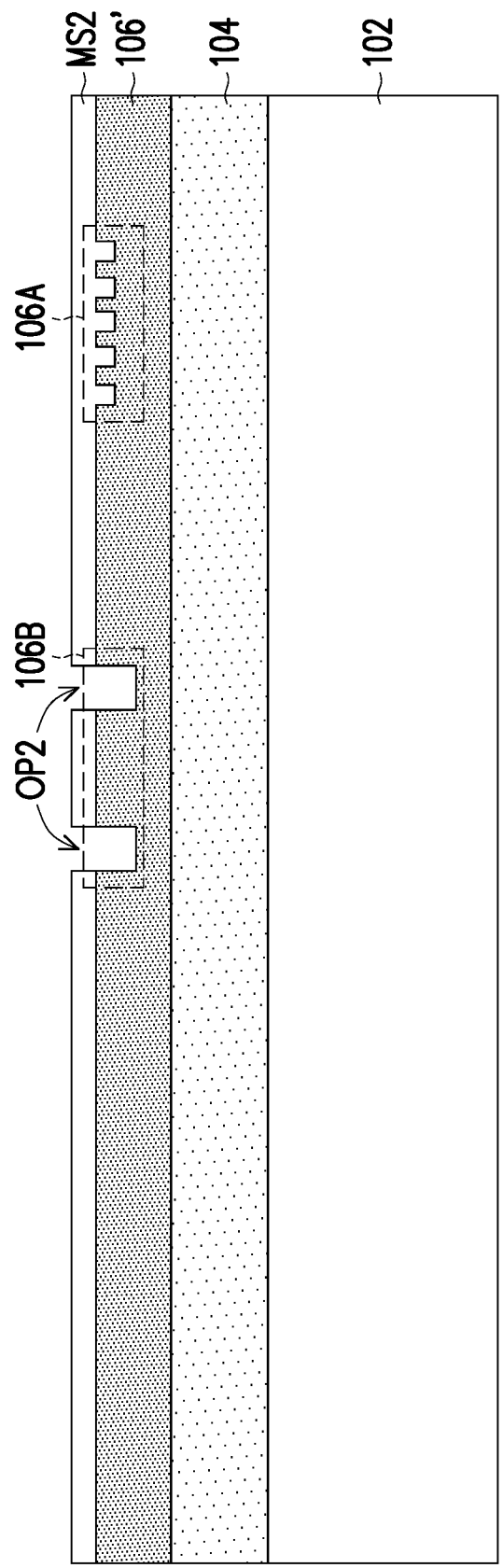

Referring to FIG. 5A, after providing the second mask layer MS2 over the core material 106, portions of the core material 106 are removed to form a waveguide structure 106B. For example, portions not covered by the second mask layer MS2 are removed to form the waveguide structure. In some embodiments, the core material 106 is patterned through a photolithography process. In certain embodiments, the core material 106 is patterned to form a core layer 106' inclusive of the grating coupler 106A and the waveguide structure 106B. The design of the waveguide structure 106B will be explained in more details by referring to the top view of the waveguide structure 106B illustrated in FIG. 5B.

Figure 5B:
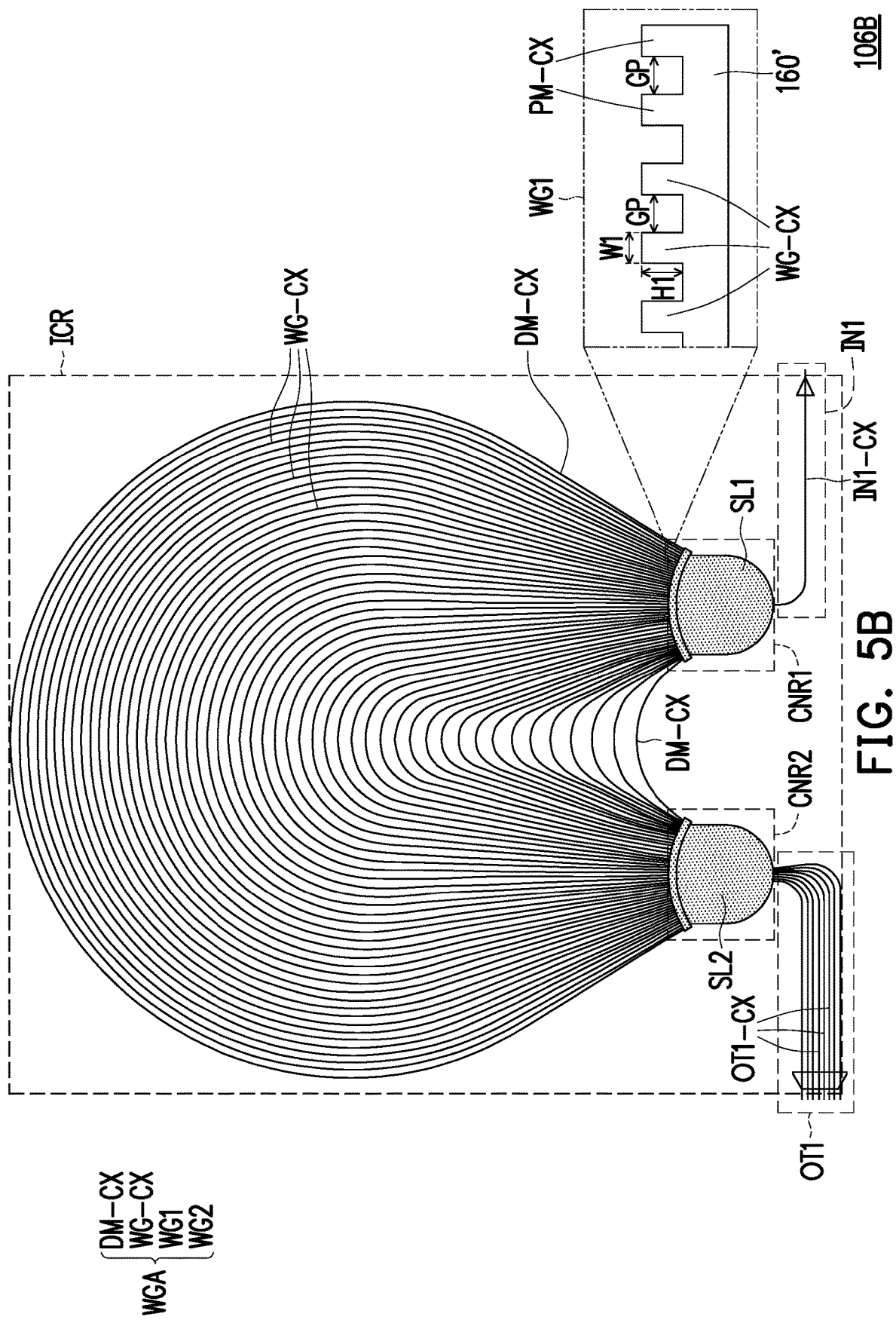

As illustrated in FIG. 5B, in some embodiments, the core material 106 is patterned to form a waveguide structure 106B including a first slab structure SL1, a second slab structure SL2, an input array IN1, an output array IN2 and a waveguide array WGA. In some embodiments, the input array IN1 is connected to the first slab structure SL1, and includes one input channel IN1-CX, but the disclosure is not limited thereto. In alternative embodiments, the input array IN1 may include one or more input channels IN1-CX. In some embodiments, the output array OT1 is connected to the second slab structure SL2, and includes a plurality of output channels OT1-CX. For example, in the exemplary embodiment, the input array IN1 consists of one input channel IN1, while the output array OT1 consists of eight output channels OT1-CX. In some embodiments, the waveguide array WGA is optically coupled to the first slab structure SL1 and the second slab structure SL2.

Figure 5C:
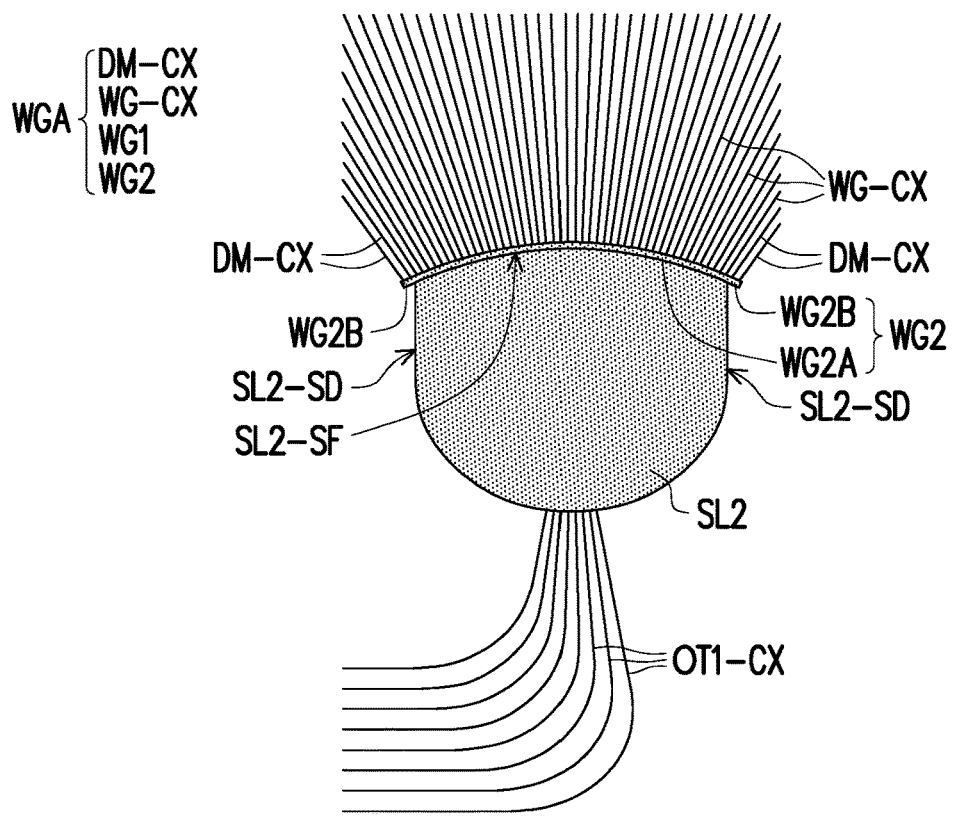
Figure 5D:
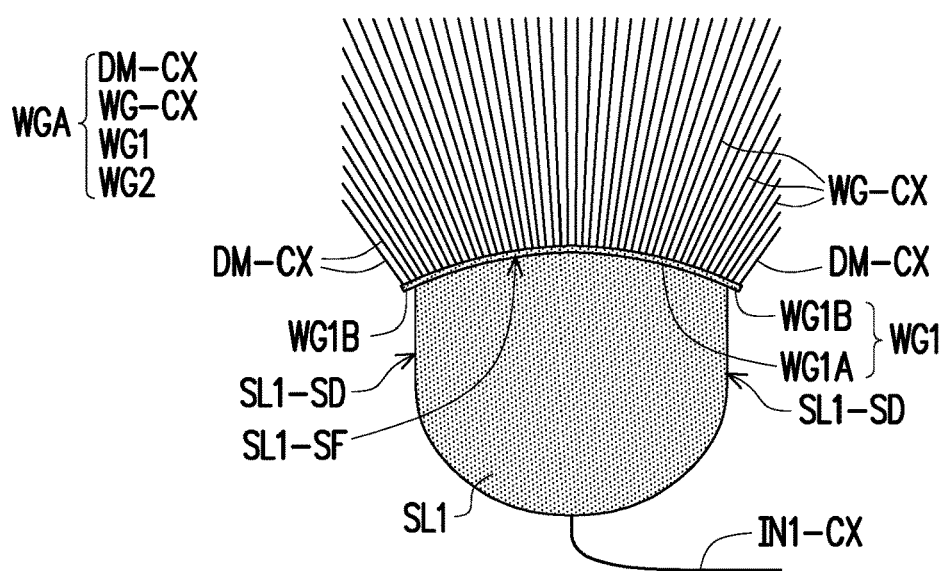

As further illustrated in FIG. 5B, and from the enlarged views of the first slab structure SL1 and the second slab structure SL2 illustrated in FIG. 5C and FIG. 5D, the waveguide array WGA includes a first connecting part WG1, a second connecting part WG2, a plurality of waveguide channels WG-CX and a plurality of auxiliary channels DM-CX. In some embodiments, the first connecting part WG1 is joined with the first slab structure SL1, whereby the first connecting part WG1 includes a central portion WG1A and flank portions WG1B located aside the central portion WG1A. As shown in FIG. 5D, the central portion WG1A of the first connecting part WG1 is connected to and overlapped with the first slab structure SL1, and the two flank portions WG1B of the first connecting part WG1 extends over two opposing side surfaces SL1-SD of the first slab structure SL1. In other words, a boundary of the flank portions WG1B of the first connecting part WG1 may be spaced apart from the side surfaces SL1-SD of the first slab structure SL1 by a certain distance.

In some embodiments, the second connecting part WG2 has a similar design with the first connecting part WG1. For example, the second connecting part WG2 is joined with the second slab structure SL2, whereby the second connecting part WG2 includes a central portion WG2A and flank portions WG2B located aside the central portion WG2A. As shown in FIG. 5C, the central portion WG2A of the second connecting part WG2 is connected to and overlapped with the second slab structure SL2, and the two flank portions WG2B of the second connecting part WG2 extends over two opposing side surfaces SL2-SD of the second slab structure SL2. In other words, a boundary of the flank portions WG2B of the second connecting part WG2 may be spaced apart from the side surfaces SL2-SD of the second slab structure SL2 by a certain distance.

In some embodiments, the plurality of waveguide channels WG-CX and the plurality of auxiliary channels DM-CX are joining the first connecting part WG1 to the second connecting part WG2, and extends from the first slab structure SL1 to the second slab structure SL2. As illustrated in FIG. 5B to FIG. 5D, the waveguide channels WG-CX are connected to the central portions WG1A, WG2A of the first and second connecting parts WG1, WG2, whereas the auxiliary channels DM-CX are connected to the flank portions WG1B, WG2B of the first and second connecting parts WG1, WG2. Each of the waveguide channels WG-CX and the auxiliary channels DM-CX have different channel lengths. For example, in the exemplary embodiment, the auxiliary channels DM-CX have the shortest length and the longest length amongst all the channels (WG-CX and DM-CX). Furthermore, the waveguide channels WG-CX have lengths that are in between the shortest auxiliary channel DM-CX and the longest auxiliary channel DM-CX.

In some embodiments, the waveguide channels WG-CX are connected to and overlapped with a first connecting surface SL1-SF of the first slab structure SL1 in a first connecting region CNR1 on the dielectric layer 104, and connected to and overlapped with a second connecting surface SL2-SF of the second slab structure SL2 in a second connecting region CNR2 on the dielectric layer 104. Furthermore, the auxiliary channels DM-CX are spaced apart from and non-overlapped with the first connecting surface SL1-SF of the first slab structure SL1 in the first connecting region CNR1, and spaced apart from and non-overlapped with the second connecting surface SL2-SF of the second slab structure SL2 in the second connecting region CNR2. In addition, the auxiliary channels DM-CX are optically coupled to the first slab structure SL1 and the second slab structure SL2 through the first connecting part WG1 and the second connecting part WG2 respectively. In certain embodiments, the waveguide channels WG-CX and the auxiliary channels DM-CX extends from the first slab structure SL1 to the second slab structure SL2 in an interconnection region ICR on the dielectric layer 104. For example, the interconnection region ICR separates the first connecting region CNR1 from the second connecting region CNR2, and surrounds the first connecting region CNR1 and the second connecting region CNR2.

In some embodiments, a ratio of the number of the auxiliary channels DM-CX to the number of the waveguide channels WG-CX is in a range of 1:2 to 1:50. In other words, the number of auxiliary channels DM-CX may be less than the number of waveguide channels WG-CX. In the illustrated embodiment, there are four auxiliary channels DM-CX as compared to forty-six waveguide channels WG-CX, for example. Furthermore, in certain embodiments, a ratio of the number of output channels OT1-CX in the output array OT1 to a sum of the number of the waveguide channels WG-CX and the auxiliary channels DM-CX is in range of 4:25 to 8:25. In the illustrated embodiment, there are eight output channels, for example. By controlling the number of waveguide channels WG-CX, the number of auxiliary channels DM-CX and the number of output channels OT1-CX in the waveguide structure 106B in the above range, low insertion loss and less channel crosstalk of the waveguide structure 106B are ensured.

As further illustrated in an enlarged sectional view of the region RG1 illustrated in FIG. 5B, each of the waveguide channels WG-CX and each of the auxiliary channels DM-CX are arranged on the first connecting part WG1 and the second connecting part WG2 with a gap GP therebetween. In some embodiments, the gap GP is formed in a range of 0.5 µm to 1 µm to ensure that the required amount of waveguide channels WG-CX and auxiliary channels DM-CX are defined in the waveguide array WGA. In addition, in the illustrated embodiment, the waveguide channels WG-CX and the auxiliary channels DM-CX have a height of H1 and a width of W1. In some embodiments, the width W1 is in a range of 2 µm to 1 µm, while the height H1 is in a range of 0.3 µm to 0.6 µm, for example. However, the disclosure is not limited thereto, and the width W1 and height H1 of the waveguide channels WG-CX and the auxiliary channels DM-CX may be appropriately adjusted based on design requirements.

In the exemplary embodiment, the grating coupler 106A is used for receiving light from the overlying light source or optical signal source, and transmitting the light to the input array IN1 of the waveguide structure 106B. Thereafter, the light diffracting out of the input array IN1 at the interface of the first slab structure SL1 propagates through a free-space region of the first slab structure SL1, and enters the waveguide array WGA. Each wavelength of light coupled to the waveguide array WGA undergoes a constant change of phase attributed to the constant length increment in the waveguide channels WG-CX and the auxiliary channels DM-CX of the waveguide array WGA. The light then traverses another free-space region of the second slab structure SL2, and light diffracted from the gratings of the waveguide array WGA interferes constructively and gets refocused at the output array OT1, whereby each of the output channels OT1-CX receives light of a certain wavelength. In the illustrated embodiment, the waveguide structure 106B is used to separate the transmitted light into eight different wavelengths at the output array OT1. In some alterative embodiments, the waveguide structure 106B is used to combine signals with separate wavelengths into a single optical fiber. In other words, the input/output function of the input array IN1 and the output array OT1 may be reversed.

Due to the packed arrangement of the waveguide channels WG-CX and the protruding arrangement the auxiliary channels DM-CX in the waveguide array WGA over the first slab structure SL1 and the second slab structure SL2, an optical leaking space on the first connecting surface SL1-SF of the first slab structure SL1 and an optical leaking space on the second connecting surface SL2-SF of the second slab structure SL2 are omitted (see FIG. 5C and FIG. 5D). In other words, an optical loss at the edges of the first slab structure SL1 and the second slab structure SL2 may be reduced or prevented. As such, in the exemplary embodiment, the waveguide structure 106B is designed to reduce insertion loss and channel cross talk, which in turn improves the channel uniformity of the transmission spectrum.

Figure 6:
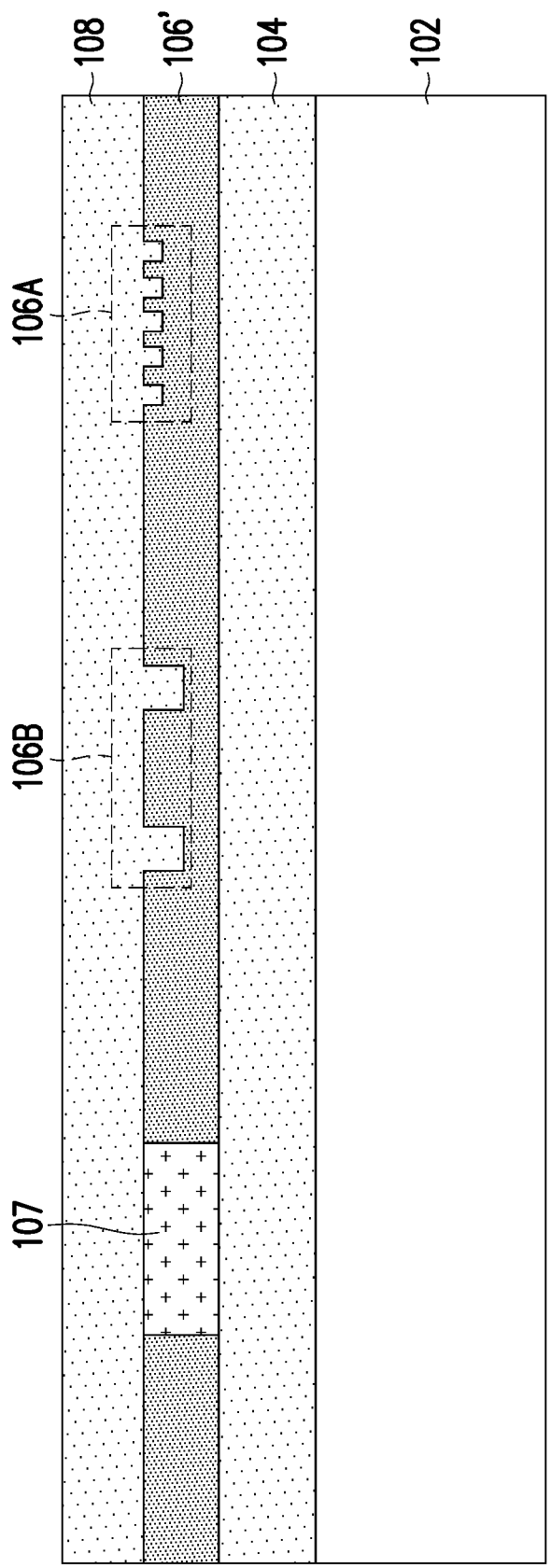

Referring to FIG. 6, after forming the grating coupler 106A and the waveguide structure 106B in the core layer 106', modulator(s) 107 used for modulating the optical signals may also be formed in the core layer 106'. Thereafter, a protection layer 108 may be formed over the dielectric layer 104 to cover the core layer 106'. In some embodiments, the protection layer 108 is formed over a top surface of the core layer 106' and cover the gratings of the grating coupler 106A and the waveguide structure 106B. The protection layer 108 may be formed of silicon oxide, silicon nitride, or the like.

Figure 7:
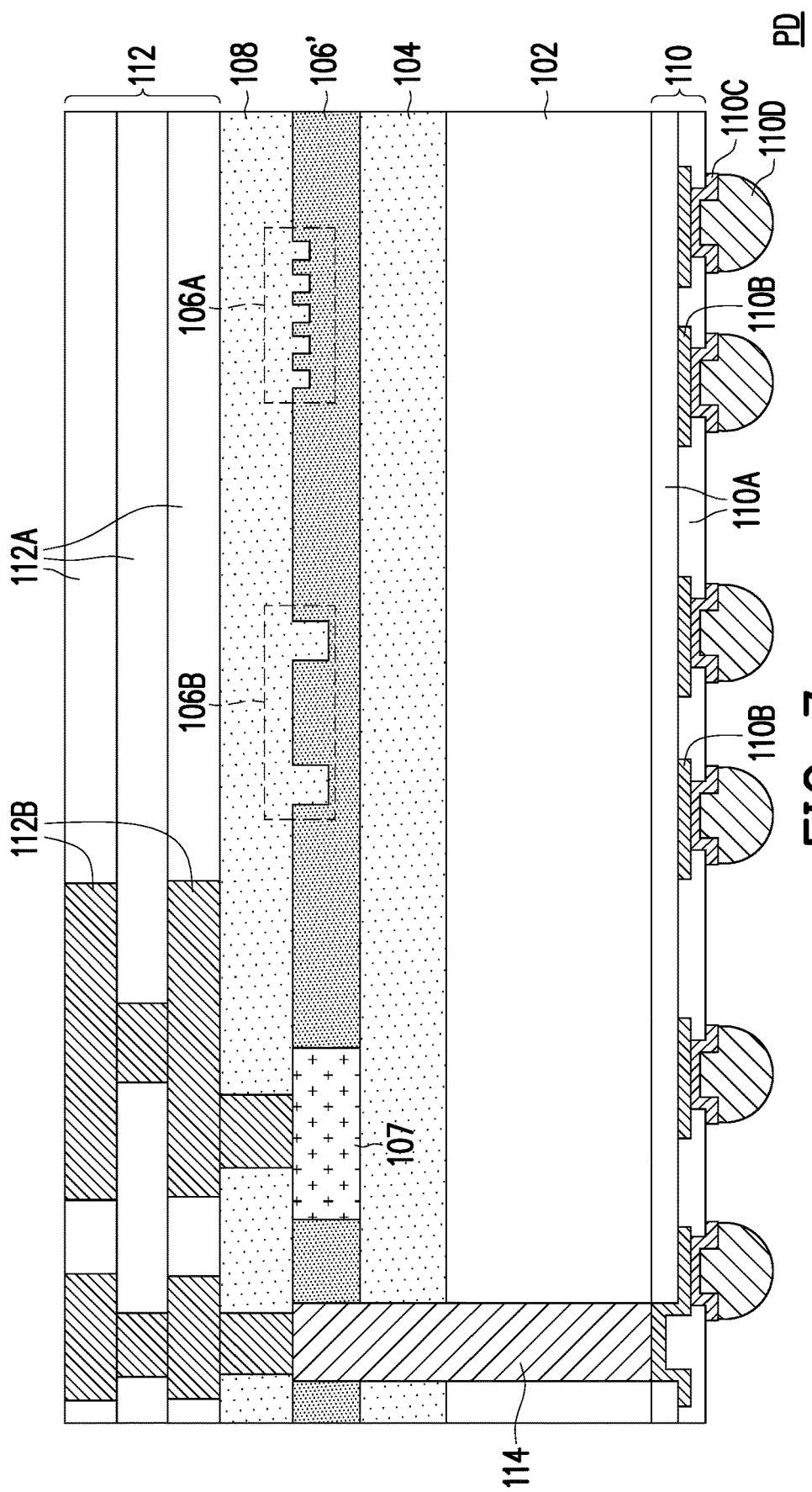

Referring to FIG. 7, in a subsequent step, an interconnection layer 110 is formed over the substrate 102, and an interconnection layer 112 is formed over the protection layer 108. In some embodiments, the formation of the interconnection layer 110 includes forming a plurality of dielectric layers 110A and a plurality of conductive layers 110B alternately stacked. For example, the conductive layers 110B are sandwiched between the dielectric layers 110A.

In some embodiments, the material of the dielectric layers 110A may be polyimide, polybenzoxazole (PBO), benzocyclobutene (BCB), a nitride such as silicon nitride, an oxide such as silicon oxide, phosphosilicate glass (PSG), borosilicate glass (BSG), boron-doped phosphosilicate glass (BPSG), a combination thereof or the like, which may be patterned using a photolithography and/or etching process. In some embodiments, the material of the dielectric layers 110A may be formed by suitable fabrication techniques such as spin-on coating, chemical vapor deposition (CVD), plasma-enhanced chemical vapor deposition (PECVD) or the like. The disclosure is not limited thereto.

In some embodiments, the conductive layers 110B may be made of conductive materials formed by electroplating or deposition, such as aluminum, titanium, copper, nickel, tungsten, and/or alloys thereof, which may be patterned using a photolithography and etching process. In some embodiments, the conductive layers 110B may be patterned copper layers or other suitable patterned metal layers. Throughout the description, the term "copper" is intended to include substantially pure elemental copper, copper containing unavoidable impurities, and copper alloys containing minor amounts of elements such as tantalum, indium, tin, zinc, manganese, chromium, titanium, germanium, strontium, platinum, magnesium, aluminum or zirconium, etc.

Referring to FIG. 7, in some embodiments, a plurality of conductive pads 110C may be disposed on an exposed top surface of the conductive layers 110B for electrically connecting with conductive balls. In certain embodiments, the conductive pads 110C are for example, under-ball metallurgy (UBM) patterns used for ball mount. Furthermore, the materials of the conductive pads 110C may include copper, nickel, titanium, tungsten, or alloys thereof or the like, and may be formed by an electroplating process, for example. The number of conductive pads 110C are not limited in this disclosure, and may be selected based on the design layout. In some alternative embodiments, the conductive pads 110C may be omitted. In other words, conductive balls 110D formed in subsequent steps may be directly disposed on the conductive layers 110B. After forming the conductive pads 110C, a plurality of conductive balls 110D is disposed on the conductive pads 110C. In some embodiments, the conductive balls 110D may be disposed on the conductive pads 110C by a ball placement process or reflow process. The number of the conductive balls 110D is not limited to the disclosure, and may be designated and selected based on the number of the conductive pads 110C.

As further illustrated in FIG. 7, the formation of the interconnection layer 112 includes forming a plurality of dielectric layers 112A and a plurality of conductive layers 112B alternately stacked. For example, the dielectric layers 112A may be formed of silicon oxide, silicon oxynitride, silicon nitride, or the like, or low-k dielectric materials having k values lower than about 3.0. The low-k dielectric materials may include Black Diamond (a registered trademark of Applied Materials), a carbon-containing low-k dielectric material, hydrogen silsesquioxane (HSQ), methylsilsesquioxane (MSQ), or the like. The conductive layers 112B may be formed using damascene processes, and may include, for example, copper on diffusion barrier layers. The diffusion barrier layers may be formed of titanium, titanium nitride, tantalum, tantalum nitride, or the like. In some embodiments, the interconnection layer 112 may be electrically connected to the interconnection layer 110 by the through vias 114. For example, the through vias 114 penetrate through the protection layer 108, the core layer 106', the dielectric layer 104 and the substrate 102, and is electrically connected to the conductive layers 110B and the conductive layers 112B. Up to here, a photonic die PD (or optical device) in accordance with some embodiments of the present disclosure is accomplished. In some embodiments, the photonic die PD is formed as part of a wafer, which includes a plurality of identical photonic dies PD arranged as an array. The arrangement of the photonic die PD in a semiconductor package may be further described in detail by referring to FIG. 8 to FIG. 10

Figure 8:
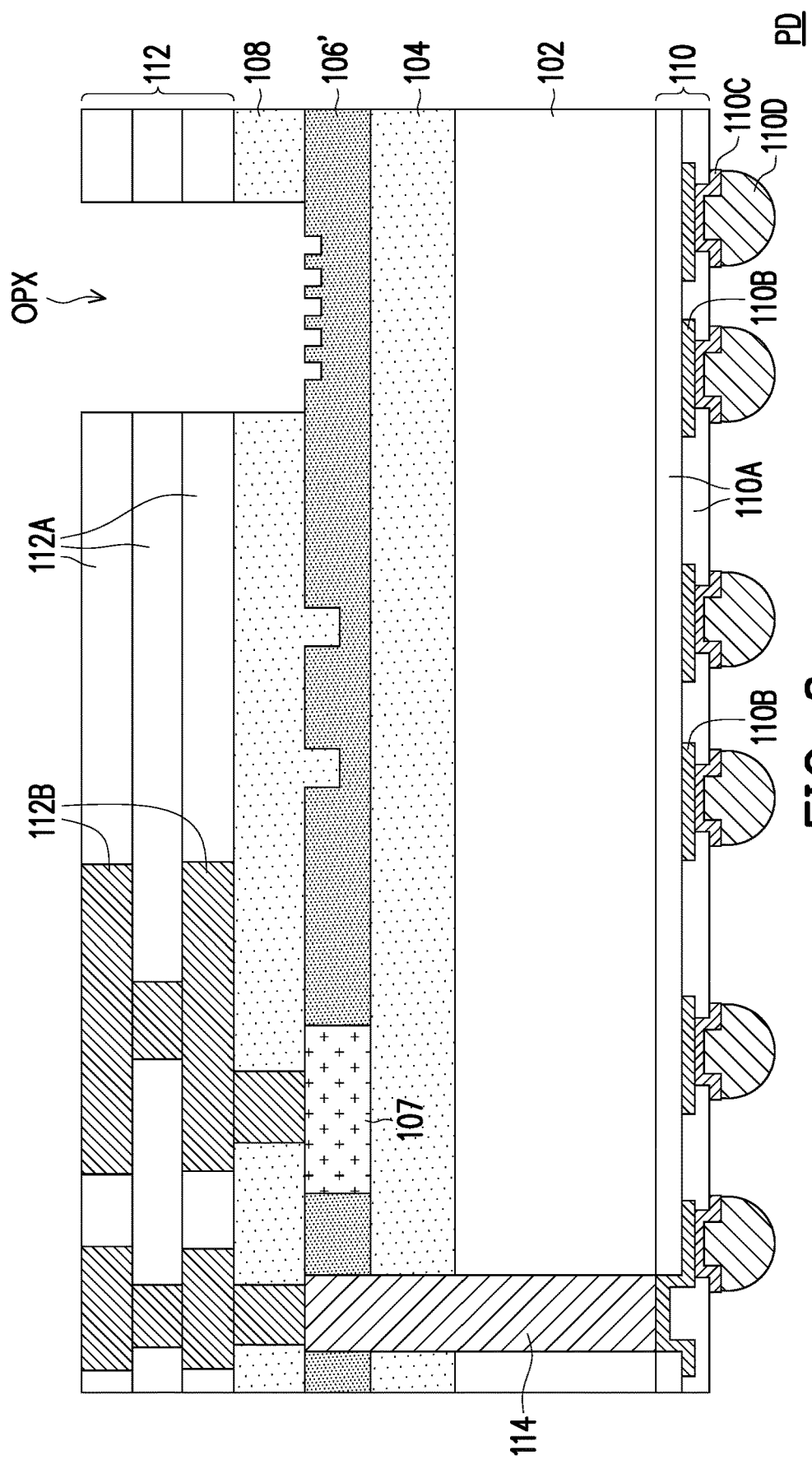
Figure 9:
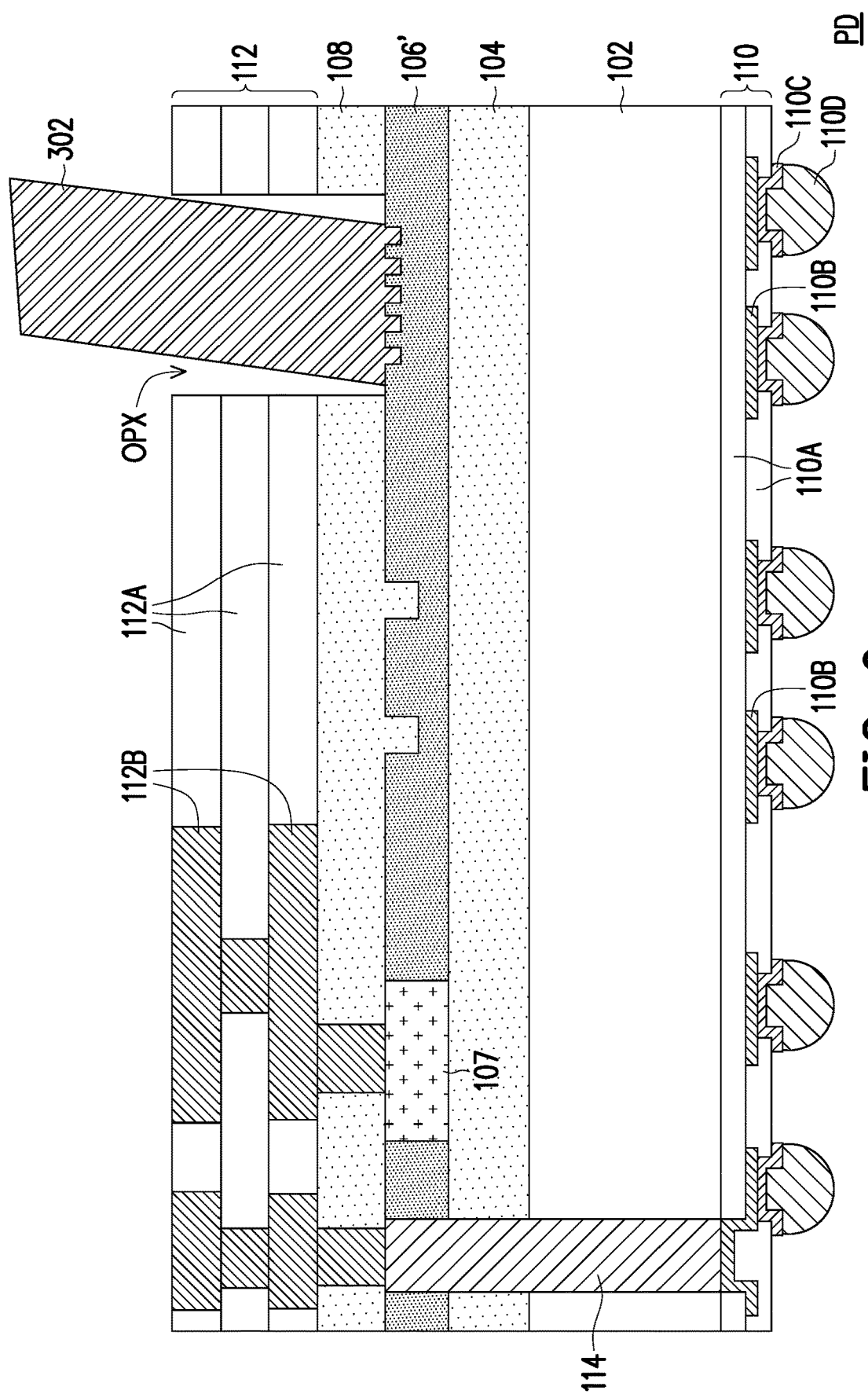

Referring to FIG. 8, in some embodiments, an opening OPX (or hole) is formed in the photonic die PD. For example, the opening OPX penetrate through the dielectric layers 112A and the protection layer 108 to reveal the underlying grating coupler 106A. The formation of the opening OPX includes an etching process using a photo lithography process, or the like. Subsequently, referring to FIG. 9, a coupler including one or more optical fibers 302 is attached to the photonic die PD. For example, the optical fiber 302 is optically coupled to the underlying grating coupler 106A. In some embodiments, the optical fiber 302 is used for the input/output of optical signals for photonic die PD. Either the light transmitted in optical fiber 302 is projected onto grating coupler 106A, or the light emitted out of grating coupler 106A is received by optical fiber 302. In some alternative embodiments, a radiation source or lamp (not shown) may be used to project light (or laser beam) onto the underlying grating coupler 106A, the disclosure is not limited thereto.

Figure 10:
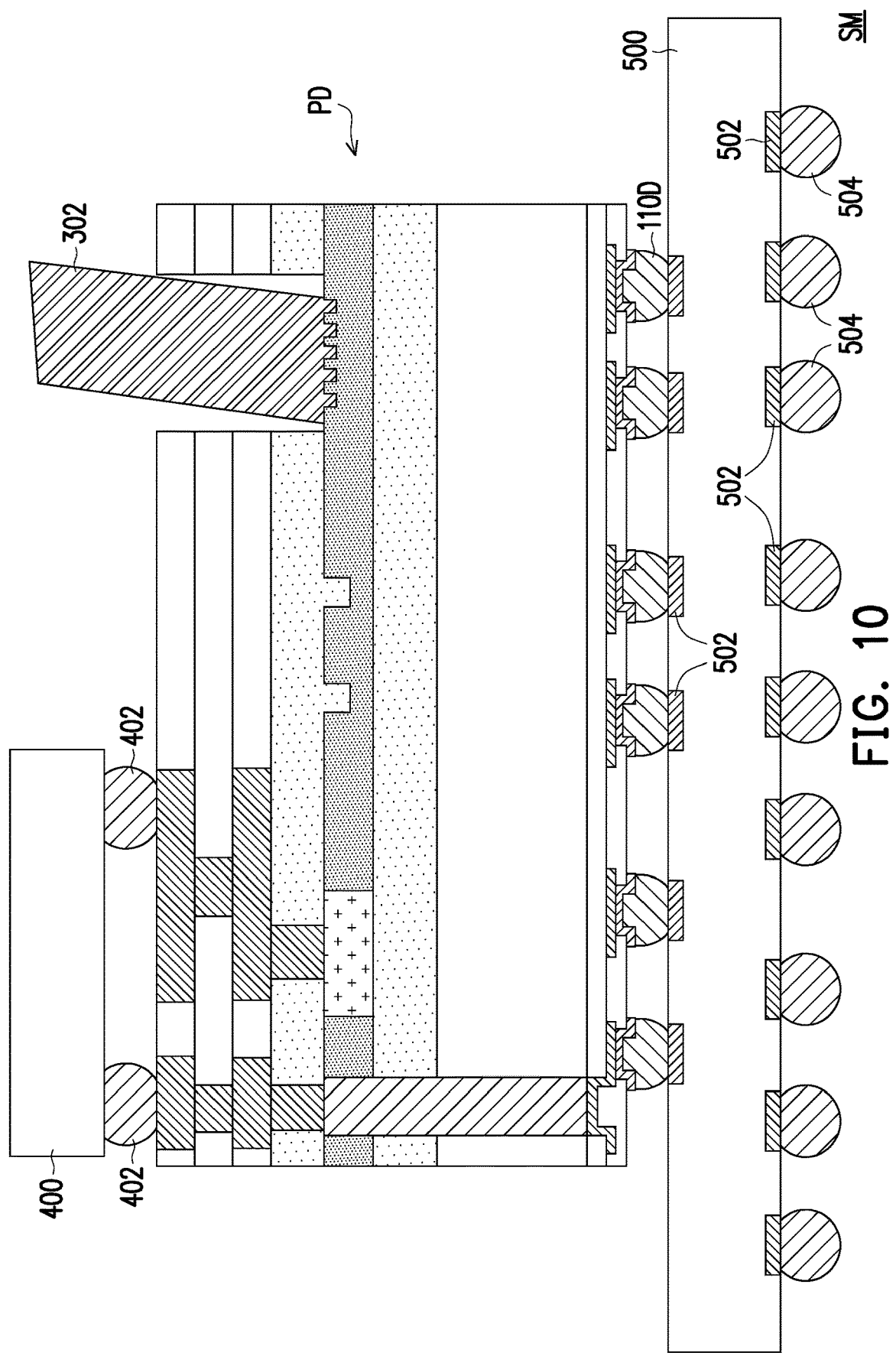

Referring to FIG. 10, in some embodiments, the photonic die PD is mounted onto a carrier substrate 500. The carrier substrate 500 may be a package substrate, integrated fan-out (InFO) packages, fan-in packages, printed circuit board, interposers or the like. The disclosure is not limited thereto. In some embodiments, the circuit substrate 500 further includes bonding pads 502 and electrical connectors 504. The bonding pads 502 may be respectively distributed on two opposite sides of the carrier substrate 500, and are exposed for electrically connecting with later-formed elements/features. In some embodiments, a plurality of metallization layers or vias (not shown) may be embedded in the carrier substrate 500, and together provide routing function for the circuit substrate 500. In some embodiments, the electrical connectors 504 are connected to the bonding pads 502 of the carrier substrate 500. In other words, the electrical connectors 504 may be electrically connected to the carrier substrate 500 through the bonding pads 502. In some embodiments, the electrical connectors 504 are, for example, solder balls or ball grid array (BGA) balls. Furthermore, the photonic die PD may be electrically connected to the carrier substrate 500 through the bonding pads 502

As further illustrated in FIG. 10, an electronic die 400 may be bonded to the photonic die PD. For example, in some embodiments, the conductive terminals 402 of the electronic die 400 is electronically connected to the interconnection layer 112 of the photonic die PD. In some embodiments, the electronic die 400 acts as a central processing unit, which includes the controlling circuit for controlling the operation of the devices in photonic die PD. Electronic die 400 also exchanges electrical signals with photonic die PD through the bonding regions. In addition, electronic die 400 includes the circuits for processing the electrical signals converted from the optical signals in photonic die PD. In the illustrated embodiment, although only one photonic die PD is provided on the carrier substrate 500, it should be noted that the disclosure is not limited thereto. For example, in alternative embodiments, two or more photonic dies PD may be disposed on the carrier substrate 500. Up to here, a semiconductor package SM in accordance with some embodiments of the present disclosure is accomplished.

Figure 11A:
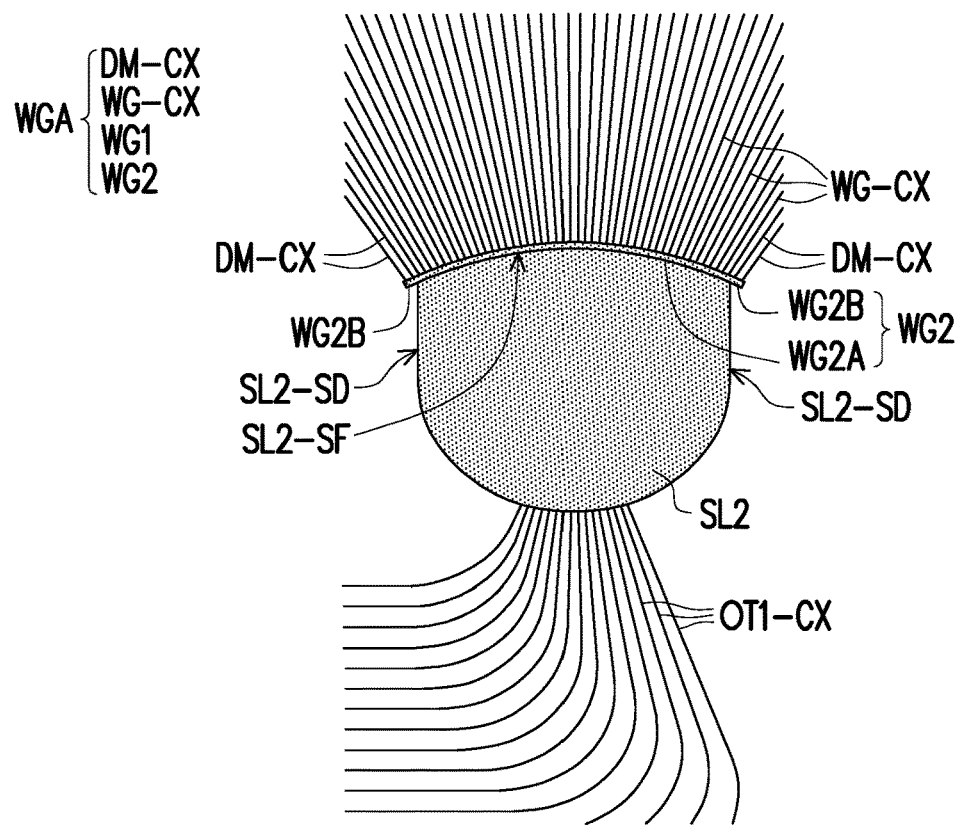
FIG. 11A and FIG. 11B are enlarged top views of a first slab structure and a second slab structure in a waveguide structure according to some exemplary embodiments of the present disclosure.
Figure 11B:
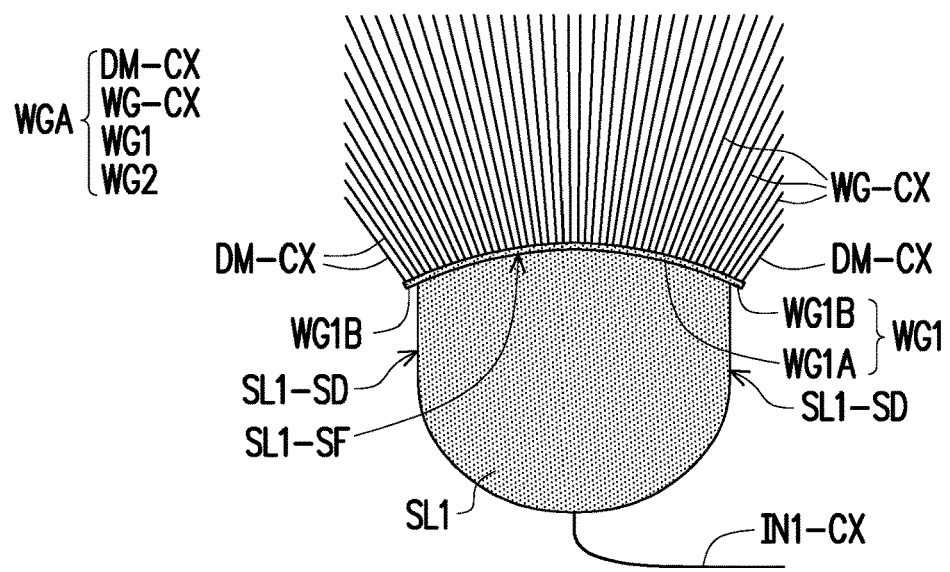

FIG. 11A and FIG. 11B are enlarged top views of a first slab structure and a second slab structure in a waveguide structure according to some exemplary embodiments of the present disclosure. The waveguide structure illustrated in FIG. 11A and FIG. 11B is similar to the waveguide structure 106B illustrated in FIG. 5B to FIG. 5D. Therefore, the same reference numerals are used to refer to the same or liked parts, and its detailed description will not be repeated herein. The difference between the embodiments is in the design of the output array OT1.

In the embodiment of FIG. 5B to FIG. 5D, the output array OT1 is shown to include eight output channels OT1-CX for separating the transmitted light into eight different wavelengths. However, the disclosure is not limited thereto. Referring to FIG. 11A, in the illustrated embodiment, the output array OT1 consists of sixteen output channels OT1-CX for separating the transmitted light into eight different wavelengths. In the exemplary embodiment, by increasing the number of output channels OT1-CX to be greater than the number of different wavelengths in the transmitted light, the channel uniformity of the transmission spectrum may be further improved. For example, by using sixteen output channels OT1-CX for transmitting light into eight different wavelengths, some of the output channels OT1-CX located near the edge may serve as dummy channels. The number of input channels IN1-CX illustrated in FIG. 11B may be the same as those of the input array IN1 described in FIG. 5D, thus will not be repeated herein.

In the embodiments of the present disclosure, due to an insertion loss being more apparent at the peripheral output channels OT1-CX, it is feasible to use the peripheral output channels OT1-CX as dummy channels (four channels on the left and right), and use the central eight output channels OT1-CX for transmitting light into eight different wavelengths. As such, the obtained transmission spectrum will have better uniformity. In the exemplary embodiment, although sixteen output channels OT1-CX are used for improving the channel uniformity of the output signal, however, the disclosure is not limited thereto. In alternative embodiments, to achieve the effect of improving channel uniformity, the number of output channels OT1-CX can be appropriately adjusted as long as it is greater than the number of different wavelengths in the transmitted light. In other words, during light transmission, at least one dummy channel will be present in the plurality of output channels OT1-CX. In some other embodiments, the number of the output channels OT1-CX can be ten (two dummy channels), or the number of the output channels OT1-CX can be increased to thirty-two (twenty-four dummy channels).

Figure 12A:
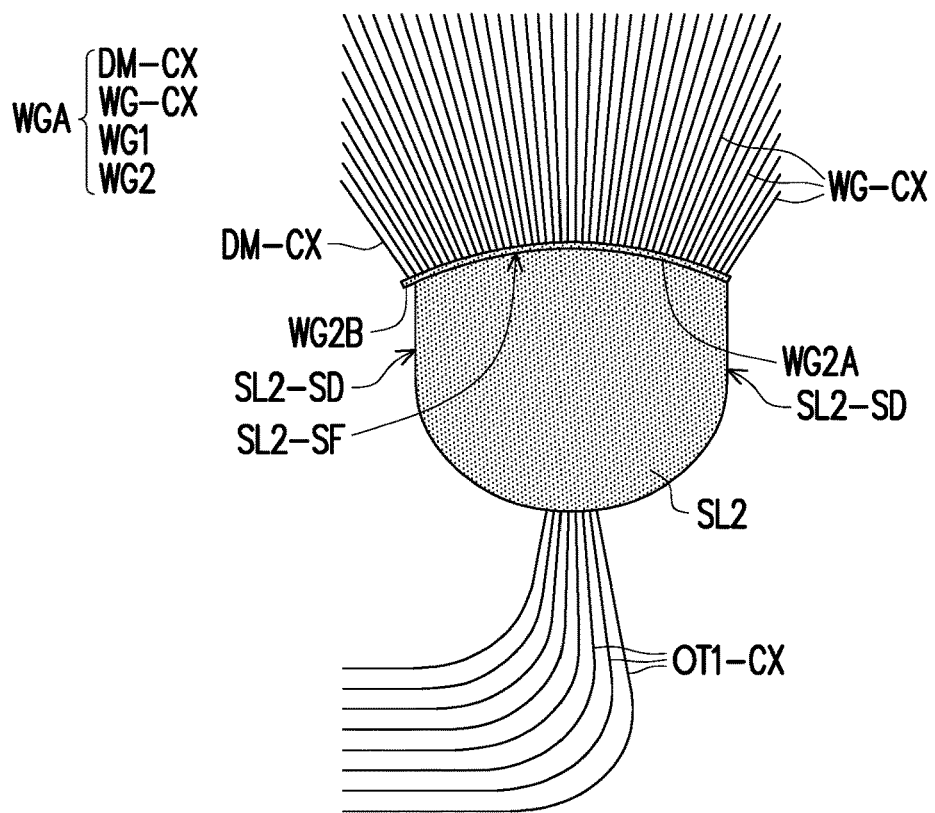
FIG. 12A and FIG. 12B are enlarged top views of a first slab structure and a second slab structure in a waveguide structure according to some other exemplary embodiments of the present disclosure.
Figure 12B:
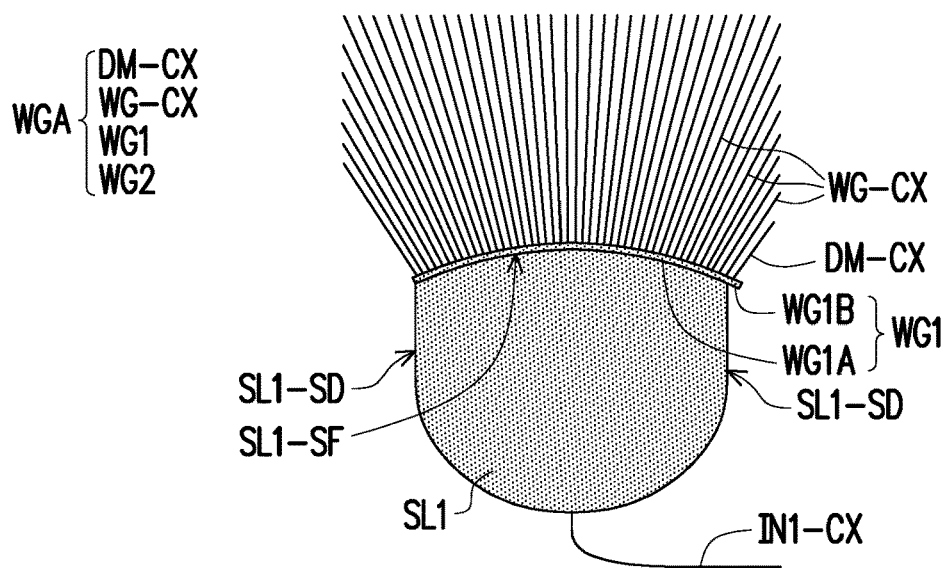

FIG. 12A and FIG. 12B are enlarged top views of a first slab structure and a second slab structure in a waveguide structure according to some other exemplary embodiments of the present disclosure. The waveguide structure illustrated in FIG. 12A and FIG. 12B is similar to the waveguide structure 106B illustrated in FIG. 5B to FIG. 5D. Therefore, the same reference numerals are used to refer to the same or liked parts, and its detailed description will not be repeated herein. The difference between the embodiments is in the number of auxiliary channels DM-CX.

In the embodiment of FIG. 5B to FIG. 5D, the waveguide array WGA is shown to include four auxiliary channels DM-CX respectively connected to the flank portions WG1B located on two sides of the central portion WG1A, and connected to the flank portions WG2B located on two sides of the central portion WG2A. However, the disclosure is not limited thereto. Referring to FIG. 12A and FIG. 12B, the first connecting part WG1 includes one flank portion WG1B protruding out from a side surface SL1-SD of the first slab structure SL1, and the second connecting part WG2 includes one flank portion WG2B protruding out from a side surface SL2-SD of the second slab structure SL2. Furthermore, one auxiliary channel DM-CX is connected to the flank portion WG1B and the flank portion WG2B. Due to the packed arrangement of the waveguide channels WG-CX and the protruding arrangement of at least one auxiliary channel DM-CX in the waveguide array WGA over the first slab structure SL1 and the second slab structure SL2, an optical leaking space on the first connecting surface SL1-SF of the first slab structure SL1 and an optical leaking space on the second connecting surface SL2-SF of the second slab structure SL2 are omitted.

Figure 13:
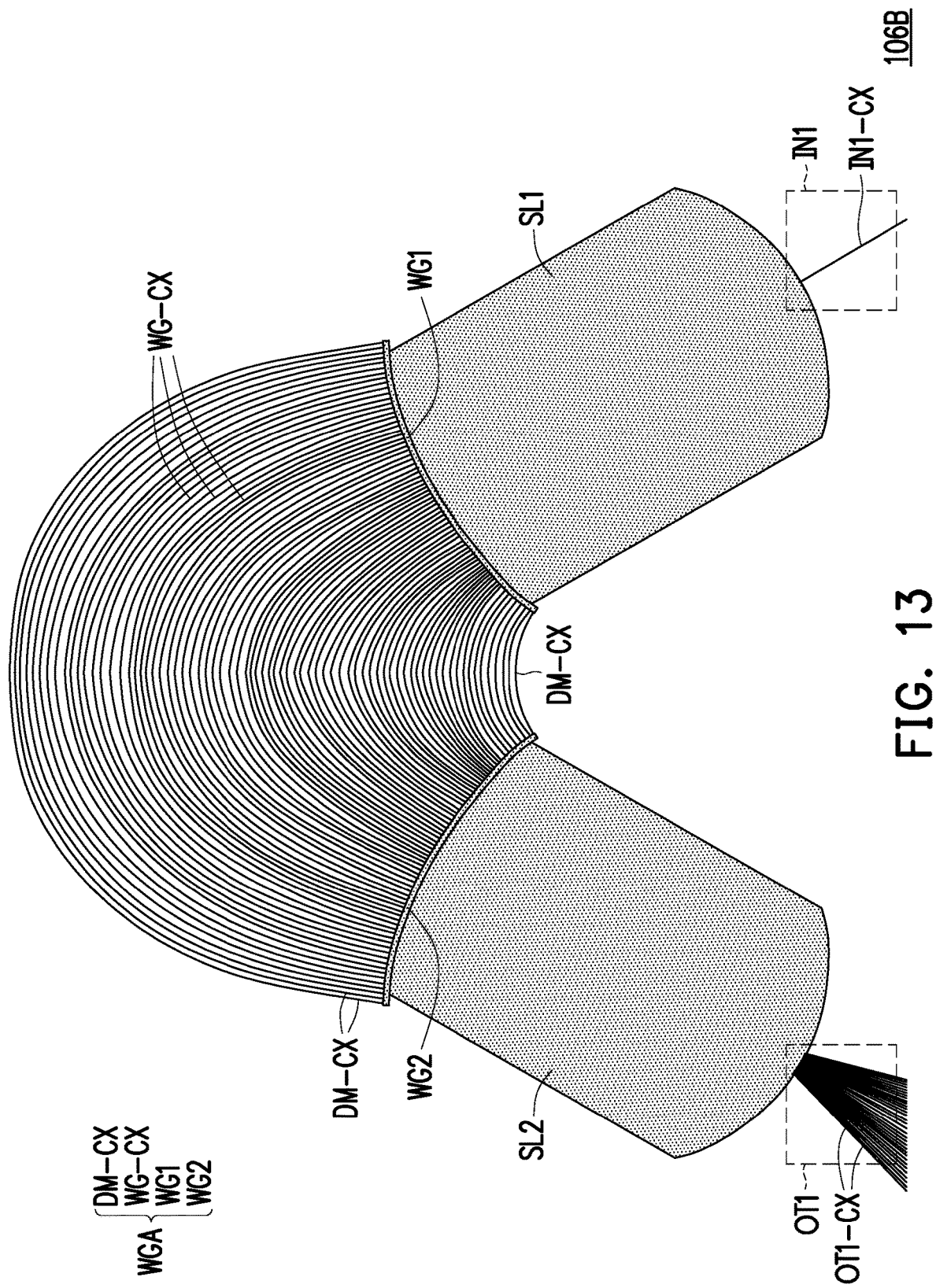
FIG. 13 is a top view of a waveguide structure according to some other exemplary embodiments of the present disclosure.

FIG. 13 is a top view of a waveguide structure according to some other exemplary embodiments of the present disclosure. The waveguide structure illustrated in FIG. 13 is similar to the waveguide structure 106B illustrated in FIG. 5B to FIG. 5D. Therefore, the same reference numerals are used to refer to the same or liked parts, and its detailed description will not be repeated herein. The difference between the embodiments is that the waveguide structure 106B illustrated in FIG. 5B to FIG. 5D is used for an 8-channel array waveguide grating (AWG), wherein as the waveguide structure 106B illustrated in FIG. 13 is used for a 32-channel AWG. In other words, the number of the output channels OT1-CX is increased to thirty-two for transmitting light into thirty-two different wavelengths. In some embodiments, when the waveguide structure 106B illustrated in FIG. 13 is used for a 32-channel AWG, the number of the output channels OT1-CX can be increased to thirty-two or more (e.g. thirty-three, thirty-four . . . ) to further improve the channel uniformity of the output signal.

In the above-mentioned embodiments, the photonic die (or optical device) comprises a waveguide structure that includes at least one auxiliary channel in the waveguide array that is spaced apart from and non-overlapped with the connecting surfaces of the slab structures. Furthermore, the number of output channels in the output array is appropriately increased by the use of dummy channels. As such, the waveguide structure can reduce insertion loss, and improves the channel uniformity of the transmission spectrum.

In accordance with some embodiments of the present disclosure, an optical device includes an input array, an output array and a waveguide array. The input array is connected to a first slab structure, while the output array is connected to a second slab structure. The waveguide array is optically coupled to the first slab structure and the second slab structure. The waveguide array includes a first connecting part, a second connecting part and a plurality of waveguide channels. The first connecting part is joined with the first slab structure. The second connecting part is joined with the second slab structure, wherein the second connecting part includes a central portion and at least one flank portion, the central portion is connected to and overlapped with the second slab structure, and the at least one flank portion extends over a side surface of the second slab structure. The waveguide channels are joining the first connecting part to the second connecting part.

In accordance with some other embodiments of the present disclosure, a semiconductor package includes a photonic die. The photonic die includes a substrate, a dielectric layer, a core layer and a protection layer. The dielectric layer is disposed on the substrate. The core layer is disposed on the dielectric layer. The core layer includes a waveguide structure including a first slab structure, a second slab structure and a waveguide array. The waveguide array is optically coupled to the first slab structure and the second slab structure. The waveguide array includes a plurality of waveguide channels and at least one auxiliary channel. The waveguide channels are connected to and overlapped with a first connecting surface of the first slab structure in a first connecting region on the dielectric layer, and connected to and overlapped with a second connecting surface of the second slab structure in a second connecting region on the dielectric layer. The auxiliary channel is spaced apart from and non-overlapped with the first connecting surface of the first slab structure in the first connecting region, and spaced apart from and non-overlapped with the second connecting surface of the second slab structure in the second connecting region, wherein the at least one auxiliary channel is optically coupled to the first slab structure and the second slab structure. The waveguide channels and the at least one auxiliary channel extends from the first slab structure to the second slab structure in an interconnection region on the dielectric layer, wherein the interconnection region separates the first connecting region from the second connecting region. The protection layer is disposed on the dielectric layer and covering the core layer.

In accordance with yet another embodiment of the present disclosure, a method of fabricating an optical device is described. The method includes the following steps. A substrate is provided. A core material is formed over the substrate. The core material is patterned to form a core layer. Pattering the core material includes patterning the core material to define a first slab structure and a second slab structure and patterning the core material to form a waveguide array optically coupled to the first slab structure and the second slab structure. Patterning the core material to form the waveguide array includes forming a first connecting part joined with the first slab structure; forming a second connecting part joined with the second slab structure, wherein the second connecting part comprises a central portion and at least one flank portion, the central portion is connected to and overlapped with the second slab structure, and the at least one flank portion extends over a side surface of the second slab structure; and forming a plurality of waveguide channels joining the first connecting part to the second connecting part. The protection layer is formed over the dielectric layer to cover the core layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
   an input array connected to a first slab structure;
   an output array connected to a second slab structure; and
   a waveguide array optically coupled to the first slab structure and the second slab structure, wherein the waveguide array comprises:
      a first connecting part joined with the first slab structure;
      a second connecting part joined with the second slab structure, wherein the second connecting part comprises a central portion and at least one flank portion that are located over a connecting surface of the second slab structure, the central portion is physically connected to and overlapped with the connecting surface of the second slab structure, and the at least one flank portion is physically joined with the central portion and is overhanging a side surface of the second slab structure while being physically separated from the side surface of the second slab structure; and
      a plurality of waveguide channels joining the first connecting part to the second connecting part.

2. The optical device according to claim 1, wherein the input array consists of one input channel, and the output array comprises eight to thirty-two output channels.

3. The optical device according to claim 1, wherein the input array consists of one input channel, and the output array consists of sixteen output channels.

4. The optical device according to claim 1, wherein the first connecting part comprises a central portion and at least one flank portion, the central portion of the first connecting part is connected to and overlapped with the first slab structure, and the at least one flank portion of the first connecting part extends over a side surface of the first slab structure.

5. The optical device according to claim 1, wherein the least one flank portion of the second connecting part includes two flank portions that are overhanging two opposing side surfaces of the second slab structure.

6. The optical device according to claim 1, wherein the plurality of waveguide channels is connected to the central portion of the second connecting part, and the optical device further comprises a plurality of auxiliary channels connected to the at least one flank portion of the second connecting part.

7. The optical device according to claim 6, wherein a ratio of the number of output channels in the output array to a sum of the number of the plurality of waveguide channels and the plurality of auxiliary channels is in range of 4:25 to 8:25.

8. The optical device according to claim 1, wherein a gap between each of the plurality of waveguide channels is in a range of 0.5 μm to 1 μm.

9. The optical device according to claim 1, wherein from a top view of the optical device, a width of the second connecting part is kept constant from the central portion to the at least one flank portion.

10. A semiconductor package, comprising:
    a photonic die, comprising:
       a substrate;
       a dielectric layer disposed on the substrate;
       a core layer disposed on the dielectric layer, wherein the core layer comprises a waveguide structure comprising:
          a first slab structure and a second slab structure;
          a waveguide array optically coupled to the first slab structure and the second slab structure, wherein the waveguide array comprises:
             a plurality of waveguide channels connected to and overlapped with a first connecting surface of the first slab structure in a first connecting region on the dielectric layer, and connected to and overlapped with a second connecting surface of the second slab structure in a second connecting region on the dielectric layer; and
             at least one auxiliary channel spaced apart from and non-overlapped with the first connecting surface of the first slab structure in the first connecting region, and spaced apart from and non-overlapped with the second connecting surface of the second slab structure in the second connecting region, wherein the at least one auxiliary channel is optically coupled to the first slab structure and the second slab structure, and
          wherein the plurality of waveguide channels and the at least one auxiliary channel extends from the first slab structure to the second slab structure in an interconnection region on the dielectric layer, wherein the interconnection region separates the first connecting region from the second connecting region;
       a protection layer disposed on the dielectric layer and covering the core layer; and
       an interconnection layer disposed over the protection layer;
    an electronic die disposed on the photonic die and electrically coupled to the photonic die.

11. The semiconductor package according to claim 10, wherein the at least one auxiliary channel comprises a plurality of auxiliary channels spaced apart from and non-overlapped with the first connecting surface of the first slab structure in the first connecting region, and spaced apart from and non-overlapped with the second connecting surface of the second slab structure in the second connecting region, and wherein the plurality of auxiliary channels extends over two side surfaces of the first slab structure and extends over two side surfaces of the second slab structure.

12. The semiconductor package according to claim 11, wherein a ratio of the number of the plurality of auxiliary channels to the number of the plurality of waveguide channels is in a range of 1:2 to 1:50.

13. The semiconductor package according to claim 10, wherein the waveguide structure further comprises:
    an input array connected to the first slab structure; and
    an output array connected to the second slab structure, wherein the input array and the output array are disposed in the interconnection region on the dielectric layer, and the interconnection region surrounds the first connecting region and the second connecting region.

14. The semiconductor package according to claim 13, wherein the input array consists of one input channel, and the output array consists of sixteen output channels.

15. The semiconductor package according to claim 10, wherein,
    the first slab structure includes the first connecting surface, a first curved surface opposite to the first connecting surface, and first flat side surfaces joining the first connecting surface to the first curved surface;
    the second slab structure includes the second connecting surface, a second curved surface opposite to the first connecting surface, and second flat side surfaces joining the second connecting surface to the second curved surface, and wherein the first flat side surfaces of the first slab structure and the second flat side surfaces of the second slab structure have no waveguide channels connected thereto.

16. A method of fabricating an optical device, comprising:
providing a substrate;
forming a core material over the substrate;
patterning the core material to form a core layer, wherein patterning the core material comprises:
　patterning the core material to define a first slab structure and a second slab structure;
　patterning the core material to form an input array connected to the first slab structure and an output array connected to the second slab structure;
　patterning the core material to form a waveguide array optically coupled to the first slab structure and the second slab structure, wherein patterning the core material to form the waveguide array comprises:
　　forming a first connecting part joined with the first slab structure;
　　forming a second connecting part joined with the second slab structure, wherein the second connecting part comprises a central portion and at least one flank portion that are located over a connecting surface of the second slab structure, the central portion is physically connected to and overlapped with the connecting surface of the second slab structure, and the at least one flank portion is physically joined with the central portion and is overhanging a side surface of the second slab structure while being physically separated from the side surface of the second slab structure; and
　　forming a plurality of waveguide channels joining the first connecting part to the second connecting part; and
　forming a protection layer over the dielectric layer and covering the core layer.

17. The method of fabricating the optical device according to claim 16, wherein the input array is formed with one input channel, and the output array is formed with sixteen output channels.

18. The method of fabricating the optical device according to claim 16, wherein patterning the core material to form the waveguide array further comprises:
　forming a plurality of auxiliary channels connected to the at least one flank portion of the second connecting part.

19. The method of fabricating the optical device according to claim 18, wherein a ratio of the number of the plurality of auxiliary channels to the number of the plurality of waveguide channels is in a range of 1:2 to 1:50.

20. The method of fabricating the optical device according to claim 16, wherein each of the plurality of waveguide channels is formed with a gap therebetween, and the gap is formed in a range of 0.5 μm to 1 μm.

* * * * *